(12) United States Patent
Randel et al.

(10) Patent No.: US 9,374,171 B2
(45) Date of Patent: Jun. 21, 2016

(54) REDUCTION OF EFFECTS OF SIGNAL-SIGNAL BEAT INTERFERENCE IN OPTICAL TRANSPORT SYSTEMS

(71) Applicant: Alcatel-Lucent USA Inc., Murray Hill, NJ (US)

(72) Inventors: Sebastian A. Randel, Aberdeen, NJ (US); Dario Pilori, Casciago (IT)

(73) Assignee: Alcatel Lucent, Boulogne-Billancourt (FR)

( * ) Notice: Subject to any disclaimer, the term of this patent is extended or adjusted under 35 U.S.C. 154(b) by 7 days.

(21) Appl. No.: 14/575,596

(22) Filed: Dec. 18, 2014

(65) Prior Publication Data

US 2016/0127049 A1 May 5, 2016

Related U.S. Application Data

(60) Provisional application No. 62/072,284, filed on Oct. 29, 2014.

(51) Int. Cl.
| | |
|---|---|
| *H04B 10/69* | (2013.01) |
| *H04B 10/61* | (2013.01) |
| *H04L 27/06* | (2006.01) |
| *H04J 14/00* | (2006.01) |
| *H04J 11/00* | (2006.01) |

(52) U.S. Cl.
CPC ........ *H04B 10/6164* (2013.01); *H04B 10/6165* (2013.01); *H04J 11/0023* (2013.01); *H04J 14/00* (2013.01); *H04L 27/066* (2013.01)

(58) Field of Classification Search
CPC .................................................. H04B 10/697
See application file for complete search history.

(56) References Cited

U.S. PATENT DOCUMENTS

| | | | |
|---|---|---|---|
| 3,605,017 A | 9/1971 | Chertok et al. | |
| 5,745,580 A | 4/1998 | Southward et al. | |
| 6,754,340 B1 | 6/2004 | Ding | |
| 8,054,874 B2 | 11/2011 | Hidaka | |
| 2013/0315267 A1* | 11/2013 | Sasaki | H04B 10/5563 370/536 |

OTHER PUBLICATIONS

X. Zhang et al., "SSBI Cancellation Method for IMDD-OFDM system with a Single Photodiode", PIERS Proceedings, Aug. 2014.*

(Continued)

*Primary Examiner* — Shi K Li
(74) *Attorney, Agent, or Firm* — Mendelsohn Dunleavy, P.C.; Yuri Gruzdkov (57) ABSTRACT

Disclosed herein is an optical transport system configured to transport an amplitude-modulated optical signal generated at the transmitter using single-sideband modulation of an optical carrier and detected at the receiver using direct optical detection. The receiver is configured to estimate the level of signal-signal beat interference (SSBI) in the electrical signal generated upon direct detection of the received optical signal by first converting this electrical signal into a modified baseband signal configured for single-sideband modulation and then squaring and appropriately scaling this modified baseband signal. The receiver is further configured to subtract the estimated level of SSBI from the electrical signal generated by the direct optical detector and to process the resulting corrected electrical signal to recover the data encoded in the amplitude-modulated optical signal. Example analog and digital circuits for estimating the level of SSBI at the receiver are disclosed.

20 Claims, 6 Drawing Sheets

(56) References Cited

OTHER PUBLICATIONS

Dochhan, Annika, et al., "Flexible bandwidth 448 Gb/s DMT Transmission for Next Generation Data Center Inter-Connects," European Conference on Optical Communication (ECOC), Cannes, France, 2014 (3 pages).

Zhang, Qiang, et al., "C-band 56Gbps Transmission over 80-km Single Mode Fiber without Chromatic Dispersion Compensation by Using Intensity-Modulation Direct-Detection," European Conference on Optical Communication (ECOC), Cannes, France, 2014 (3 pages).

M. Oerder and H. Meyr, "Digital filter and square timing recovery," IEEE Transactions on Communications, 1988, vol. 36, No. 5, pp. 605-612.

Peng, Wei-Ren, et al., "Spectrally Efficient Direct-Detected OFDM Transmission Incorporating a Tunable Frequency Gap and an Iterative Detection Techniques," Journal of Lightwave Technology, vol. 27, No. 24, 2009, pp. 5723-5735.

\* cited by examiner

REDUCTION OF EFFECTS OF SIGNAL-SIGNAL BEAT INTERFERENCE IN OPTICAL TRANSPORT SYSTEMS

CROSS-REFERENCE TO RELATED APPLICATIONS

This application claims priority from U.S. Provisional Patent Application No. 62/072,284 filed on Oct. 29, 2014, and entitled "REDUCTION OF EFFECTS OF SIGNAL-SIGNAL BEAT INTERFERENCE IN OPTICAL TRANSPORT SYSTEMS." This provisional application is incorporated herein by reference in its entirety.

BACKGROUND

1. Field

The present disclosure relates to optical communication equipment and, more specifically but not exclusively, to methods and apparatus for reducing effects of signal-signal beat interference (SSBI) in optical transport systems.

2. Description of the Related Art

This section introduces aspects that may help facilitate a better understanding of the disclosure. Accordingly, the statements of this section are to be read in this light and are not to be understood as admissions about what is in the prior art or what is not in the prior art. For short- and medium-reach optical transport, the use of relatively low-cost and/or relatively low-complexity systems employing direct detection may be beneficial. For example, unlike conventional coherent detection of optical signals, direct detection does not require an optical local oscillator (LO). The corresponding digital signal processing at the optical receiver may be simplified because there is no need for the LO frequency-offset compensation or phase correction. However, optical transport systems configured to use direct detection of optical signals at the receiver may suffer from the deleterious effects of SSBI.

SUMMARY OF SOME SPECIFIC EMBODIMENTS

Disclosed herein are various embodiments of an optical transport system configured to transport an amplitude-modulated optical signal generated at the transmitter using single-sideband modulation of an optical carrier and detected at the receiver using direct (e.g., square-law) optical detection. The receiver is configured to estimate the level of SSBI in the electrical signal generated upon direct detection of the received optical signal by first converting this electrical signal into a modified baseband signal configured for single-sideband modulation and then squaring and appropriately scaling this modified baseband signal. The receiver is further configured to subtract the estimated level of SSBI from the electrical signal generated by the direct optical detector and to process the resulting corrected electrical signal to recover the data encoded in the amplitude-modulated optical signal. Example analog and digital circuits for estimating the level of SSBI at the receiver are disclosed. Some embodiments of the optical transport system disclosed herein may advantageously provide a relatively inexpensive alternative to conventional optical transport systems configured for coherent detection of optical signals in short- and medium-reach optical transport links.

According to one embodiment, provided is an apparatus comprising: an optical detector configured to convert an optical input signal into a first electrical signal proportional to an optical power of the optical input signal; and an electrical signal-processing circuit that comprises: a single-sideband generator configured to generate a second electrical signal based on the first electrical signal, wherein the second electrical signal is a baseband signal configured for single-sideband modulation; a circuit module configured to convert the second electrical signal into a third electrical signal configured to approximate a magnitude of signal-signal beat interference in the first electrical signal; and an adder configured to subtract the third electrical signal from the first electrical signal to generate a corrected baseband signal; and wherein the electrical signal processing circuit is configured to recover data encoded in the optical input signal based on the corrected baseband signal.

According to another embodiment, provided is an optical-communication method comprising the steps of: converting an optical input signal into a first electrical signal proportional to an optical power of the optical input signal; generating a second electrical signal based on the first electrical signal, wherein the second electrical signal is a baseband signal configured for single-sideband modulation; converting the second electrical signal into a third electrical signal configured to approximate a magnitude of signal-signal beat interference in the first electrical signal; subtracting the third electrical signal from the first electrical signal to generate a corrected baseband signal; and recovering data encoded in the optical input signal based on the corrected baseband signal.

BRIEF DESCRIPTION OF THE DRAWINGS

Other aspects, features, and benefits of various disclosed embodiments will become more fully apparent, by way of example, from the following detailed description and the accompanying drawings, in which.

DETAILED DESCRIPTION

Growing traffic demands create a need for low-cost and low-power 100 Gb/s communication links over distances on the order of 100 km. Existing products that employ intensity modulation and direct-detection (IM/DD) are mostly configured to operate at 10 Gb/s over up to 80 km of single-mode fiber. Chromatic dispersion (CD) becomes a major limitation when scaling these systems to higher data rates. Embodiments disclosed herein are generally directed at methods and apparatus configured to use single-sideband (SSB) modulation and inventive signal-processing techniques to overcome this limitation.

To aid the understanding of the operating principles of the disclosed embodiments, we first provide a brief mathematical description of some relevant physical processes in the corresponding optical transport system. Some specific example embodiments are then described in reference to FIGS. 1-6.

Let us assume that we want to transmit a real-valued signal $S_R(t)$ over a passband channel that allows us to modulate at the same time the amplitude and the phase of a carrier at frequency $f_0$ while we apply square-law detection (also sometimes referred to as power, intensity, or direct detection) at the receiver. Using the Hilbert transform $\mathcal{H}\{\bullet\}$, we can transform $S_R(t)$ into a second real-valued signal $S_I(t)=\mathcal{H}\{S_R(t)\}$ such that the complex-valued analytic signal $S(t)=S_R(t)+jS_I(t)$ is an SSB signal that contains spectral components only at either positive or negative frequencies (with respect to the carrier frequency), but not at both.

Next, the complex-valued analytic signal S(t) with unit power is modulated onto an optical carrier at frequency $f_0$ (having a typical value of about 193.1 THz) resulting in the complex envelope C(t) given by Eq. (1):

$$C(t)=aS(t)+b \quad (1)$$

where a is the amplitude of the single sideband, and b is the amplitude of the optical carrier at frequency $f_0$. In general, the constants a and b are complex-valued and satisfy the unit-power constraint expressed as $|a|^2+|b|^2=1$.

One can now define the carrier-to-signal-power ratio ($d^2$, CSPR) using Eq. (2) as follows:

$$d^2 = \frac{|b|^2}{|a|^2} = \frac{|b|^2}{1-|b|^2} = \frac{1-|a|^2}{|a|^2} \quad (2)$$

The CD in the fiber link can mathematically be described by the unit-energy impulse response h(t). With the use of square-law detection and presence of additive noise N(t), the received baseband signal R(t) can be expressed as follows:

$$R(t)=|E(t)*h(t)|^2+N(t) \quad (3)$$

where the "*" symbol denotes the convolution operation.

For the purposes of this mathematical description, we can neglect the effects of fiber loss, polarization-mode dispersion, optical filtering, and fiber nonlinearities. Using these simplifications and the equations introduced above, the received baseband signal R(t) can be expressed using Eq. (4) as follows:

$$R(t)=|aS(t)*h(t)|^2+2Re\{ab*S(t)*h(t)\}+|b|^2+N(t) \quad (4)$$

Eq. (4) can further be transformed and rewritten as:

$$R(t)=|a||b|S_R(t)*g(t)+|a|^2|S(t)*h(t)|^2+|b|^2+N(t) \quad (5)$$

where g(t) is a real-valued impulse response whose Fourier transform G(f) is given by Eq. (6):

$$G(f) = \begin{cases} H(f)\exp[j(\varphi_a - \varphi_b)], & \forall f > 0 \\ 2\cos(\varphi_a - \varphi_b), & \forall f = 0 \\ H^*(-f)\exp[-j(\varphi_a - \varphi_b)], & \forall f < 0 \end{cases} \quad (6)$$

where H(f) is the Fourier transform of h(t), and $\varphi_a$ and $\varphi_b$ are the phases of a and b, respectively. Above, it was implicitly assumed that the signal S(t) has frequency components at positive frequencies only. An assumption to the contrary, i.e., that the signal S(t) has frequency components at negative frequencies only, leads to Eq. (6) defining $G^*(-f)$ instead.

After subtracting the dc term $|b|^2$ and applying straightforward normalization, we obtain the following expression for the normalized baseband signal R'(t):

$$R'(t)=S_R(t)*g(t)+d^{-1}|S(t)*h(t)|^2+d^{-1}(d^2+1)N(t) \quad (7)$$

This expression indicates that the normalized baseband signal R'(t) can be approximated using three additive components. The first component (i.e., $S_R(t)*g(t)$) is the transmit signal $S_R(t)$ that has been passed through the linear channel with the impulse response g(t). The second component (i.e., $d^{-1}|S(t)*h(t)|^2$) is a signal impairment caused by the SSBI. The third component (i.e., $d^{-1}(d^2+1)N(t)$) is a signal impairment caused by the noise. By increasing the CSPR (represented by the variable d; see Eq. (2)), one could reduce the relative magnitude of the SSBI impairment. However, this would also increase the noise impairment at the same time. Eq. (7) also indicates that there may exist an optimal d value, at which the combined magnitude of the two impairments is minimized.

While the noise is a random process, the SSBI is deterministic and can in principle be reduced or eliminated. Various embodiments disclosed herein below are directed at mitigating the deleterious effects of SSBI based on the insight obtained from the above mathematical description. It will be evident from the following description that the various embodiments can advantageously be implemented using circuits of relatively low complexity.

For better understanding the principles of operation of the example embodiments described herein below in reference to FIGS. 1-6, it is helpful to note that:

$$S(t)*h(t)=[S_R(t)+j\mathcal{H}\{S_R(t)\}]*h(t)=[S_R(t)+j\mathcal{H}\{S_R(t)\}]*g(t)=S_R(t)*g(t)+j\mathcal{H}\{S_R(t)*g(t)\} \quad (8)$$

When the second component (i.e., the SSBI impairment) and the third component (i.e., the noise impairment) of the normalized baseband signal R'(t) given by Eq. (7) are relatively low, Eq. (7) can be reduced to an approximation given by Eq. (9):

$$R'(t) \approx S_R(t)*g(t) \quad (9)$$

Using Eqs. (8) and (9), the SSBI impairment in Eq. (7) can be approximated as follows:

$$d^{-1}|S(t)*h(t)|^2 \approx \gamma|R'(t)+j\mathcal{H}\{R'(t)\}|^2 \quad (10)$$

where $\gamma$ is a real-valued scaling factor. An example embodiment disclosed herein is configured to reduce the adverse effects of SSBI by subtracting the estimated magnitude of the SSBI impairment given by Eq. (10) from the baseband signal as indicated in Eq. (11):

$$R''(t)=R'(t)-\gamma|R'(t)+j\mathcal{H}\{R'(t)\}|^2 \quad (11)$$

where R''(t) is a corrected baseband signal, in which the SSBI impairment has been significantly reduced or canceled.

Figure 1:
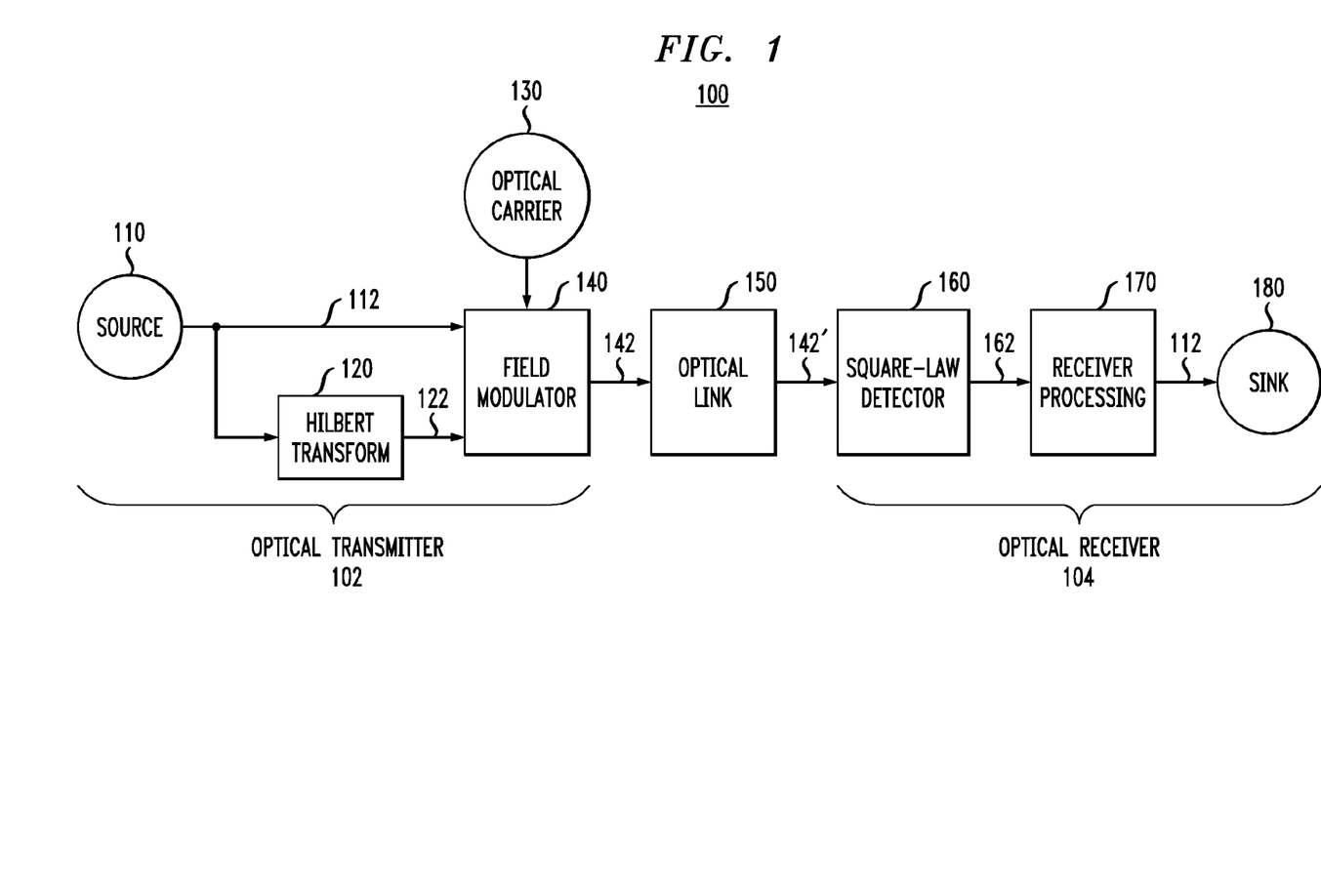
FIG. 1 shows a block diagram of an optical transport system according to an embodiment of the disclosure.

FIG. 1 shows a block diagram of an optical transport system 100 according to an embodiment of the disclosure. System 100 comprises an optical transmitter 102 configured to transmit a communication signal (e.g., data) 112 to an optical receiver 104 via an optical transport link (e.g., optical fiber) 150. More specifically, optical transmitter 102 is configured to use SSB modulation to generate a modulated optical signal 142 encoded with data 112. Link 150 transports optical signal 142 to optical receiver 150 while subjecting the transported optical signal to various impairments, such as CD and noise. The resulting impaired optical signal is optical signal 142'. Optical receiver 104 is configured to use square-law detection to detect optical signal 142' and then process the resulting electrical signal, e.g., as further described below, to recover data 112.

In an example embodiment, optical transmitter 102 comprises a signal source (e.g., an input port) 110 configured to generate electrical communication signal 112. A Hilbert-transform module operates to apply a Hilbert transform to signal 112, thereby transforming it into a corresponding transformed electrical signal 122. Both electrical signals 112 and 122 are then used to drive a field modulator 140 coupled to an optical-carrier source (e.g., a laser) 130. Field modulator 140 may comprise a conventional optical I-Q modulator, wherein electrical signal 112 is used to generate the in-phase (I) component of optical signal 142, and electrical signal 122 is used to generate the quadrature (Q) component of optical signal 142.

In an example embodiment, optical receiver 104 comprises a square-law detector (e.g., a photodiode) 160 configured to convert optical signal 142' received from link 150 into a corresponding electrical signal 162 that is proportional to the power (intensity) of optical signal 142'. Optical receiver 104 further comprises a signal processor 170 configured to process electrical signal 162 to recover communication signal 112. The recovered communication signal 112 is then applied to a signal sink (e.g., an output port) 180.

As already explained above, electrical signal 162 is typically impaired by SSBI. In an example embodiment, signal processor 170 may be configured, inter alia, to reduce the adverse effects of SSBI using an approximation of electrical signal 162 given by Eqs. (7) and (10). Several example embodiments of signal processor 170 are described in more detail below in reference to FIGS. 2-6.

Figure 2:
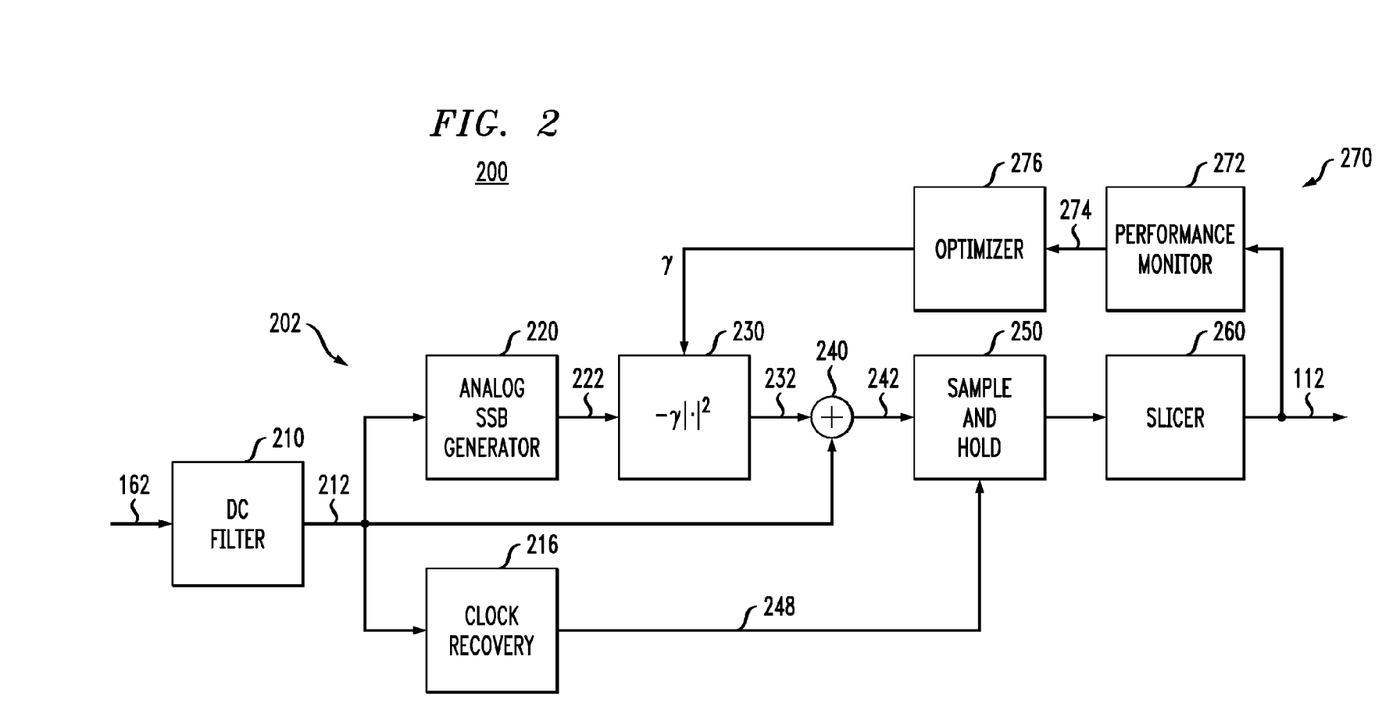
FIG. 2 shows a block diagram of an electrical circuit that can be used in the optical transport system of FIG. 1 according to an embodiment of the disclosure.

FIG. 2 shows a block diagram of an electrical circuit 200 that can be used as signal processor 170 (FIG. 1) according to an embodiment of the disclosure. As such, circuit 200 is illustratively shown in FIG. 2 as being configured to receive electrical signal 162 and output the recovered communication signal 112 (also see FIG. 1). One of ordinary skill in the art will understand that alternative input/output configurations of circuit 200 are also possible. Circuit 200 is generally designed for processing electrical signals derived from pulse-amplitude-modulated (PAM) optical signals.

Electrical circuit 200 includes a dc filter 210 configured to remove the dc component of electrical signal 162, thereby generating a filtered electrical signal 212. A first copy of filtered electrical signal 212 is applied to a clock recovery circuit 216. A second copy of filtered electrical signal 212 is applied to an adder 240. A third copy of filtered electrical signal 212 is applied to an SSBI-estimation branch 202.

In an example embodiment, branch 202 comprises an analog SSB generator 220 and a squaring module 230. Analog SSB generator 220 is configured to transform filtered electrical signal 212 into a corresponding modified baseband signal 222 in accordance with Eq. (12):

$$S_{222}(t) = S_{212}(t) + j\mathcal{H}\{S_{212}(t)\} \tag{12}$$

where $S_{222}$ and $S_{212}$ denote signals 222 and 212, respectively. Representative circuits that can be used to implement analog SSB generator 220 are disclosed, e.g., in U.S. Pat. No. 3,605,017, which is incorporated herein by reference in its entirety.

One of ordinary skill in the art will understand that modified baseband signal 222 is configured for single-sideband modulation. As used herein, the phrase "baseband signal configured for single-sideband modulation" should be construed to mean that, if said baseband signal is used to modulate a carrier wave, then the resulting modulated carrier wave will have a spectral content in which most (e.g., more than 50%) of the total power is contained in a sideband located at the positive or the negative frequency offset with respect to the carrier frequency, while the other (symmetrically offset with respect to the carrier frequency) sideband is substantially suppressed (e.g., has less than 10% of the total power). A baseband signal configured for single-sideband modulation may be generated, e.g., using a Hilbert transform, as indicated in Eq. (12). Other methods for generating baseband signals configured for single-sideband modulation are also known to persons of ordinary skill in the relevant arts.

Squaring module 230 is configured to transform modified baseband signal 222 into a corresponding scaled squared signal 232 in accordance with Eq. (13):

$$S_{232}(t) = \gamma |S_{222}(t)|^2 \tag{13}$$

where $\gamma$ is a real-valued scaling factor. One of ordinary skill in the art will recognize that the amplitude of signal 232 so generated is proportional to the electrical power of modified baseband signal 222.

In one embodiment, the value of the scaling factor $\gamma$ may be set to a fixed value. In an analog implementation of squaring module 230, the value of $\gamma$ may be set as a certain voltage level that is "factory-defined." In a digital implementation of squaring module 230, the value of $\gamma$ may be stored in a memory block (not explicitly shown in FIG. 2). In some embodiments, the value of $\gamma$ stored in the memory block may be adjustable by the user, e.g., via appropriate software.

In an alternative embodiment, the value of $\gamma$ may be adjustable using an optional feedback path 270. In an example embodiment, feedback path 270 comprises a performance monitor 272 and an optimization module 276. In operation, performance monitor 272 measures a suitable performance metric (e.g., the bit-error rate, BER) corresponding to the recovered communication signal 112 and then provides the measured value, via a feedback signal 274, to optimization module 276. Based on feedback signal 274, optimization module 276 iteratively changes the value of $\gamma$ used in squaring module 230, e.g., until a suitable "optimal" value is found. The optimal value may be selected such that its use in squaring module 230 results in an acceptably low BER for the recovered communication signal 112. Suitable gradient-descent optimization algorithms that can be adapted for use in optimization module 276 are disclosed, e.g., in U.S. Pat. Nos. 5,745,580, 6,754,340, and 8,054,874, all of which are incorporated herein by reference in their entirety.

Adder 240 operates to generate a corrected electrical signal 242 by summing signals 212 and 232. One of ordinary skill in the art will appreciate that corrected electrical signal 242 is substantially generated in accordance with Eq. (11). As such, corrected electrical signal 242 is characterized by a significantly reduced or canceled SSBI impairment.

A sample-and-hold circuit 250 samples corrected electrical signal 242 using a clock signal 248 generated by a clock-recovery module 216. A slicer 260 then quantizes the signal samples received from sample-and-hold circuit 250 as known in the art, e.g., using minimum-distance decisions. The digital output signal generated by slicer 260 is the recovered communication signal 112 (also see FIG. 1).

Figure 3:
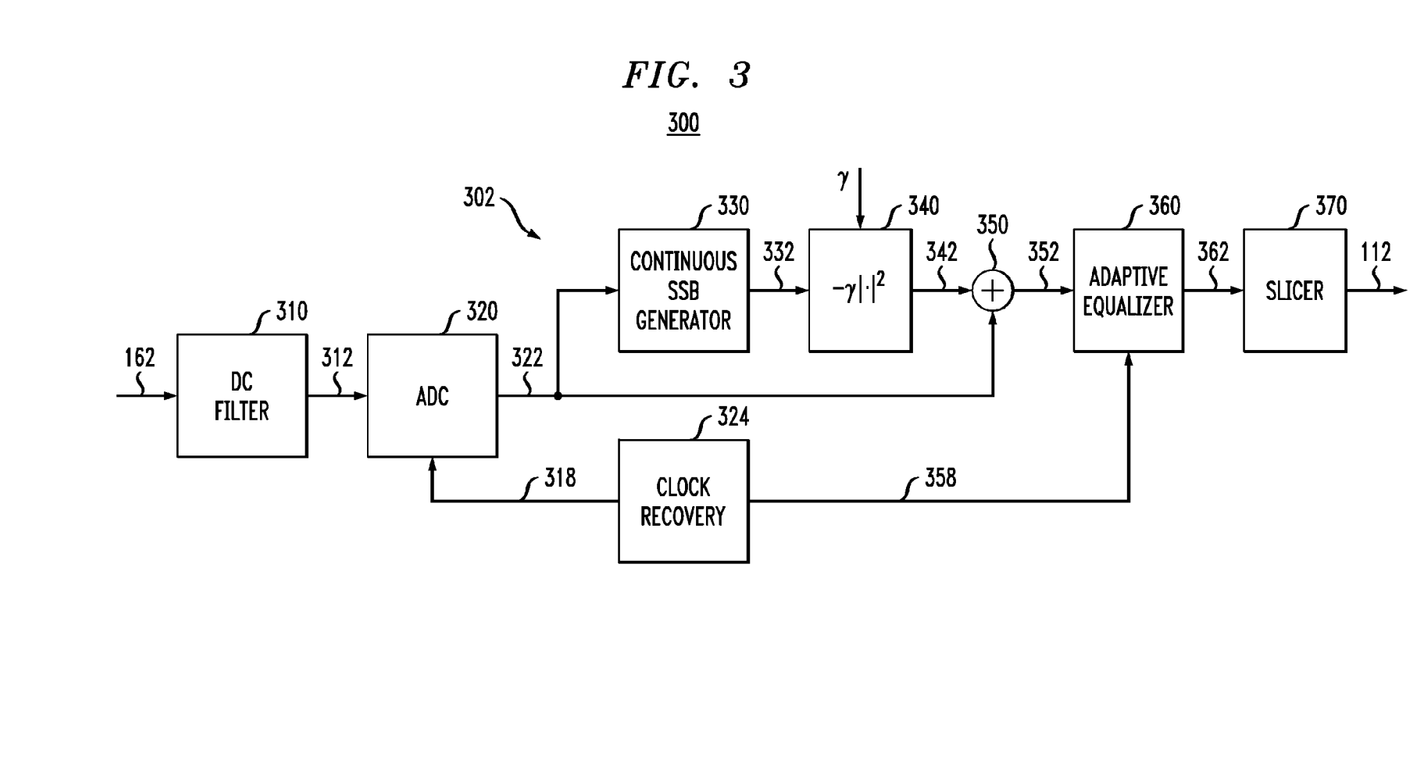
FIG. 3 shows a block diagram of an electrical circuit that can be used in the optical transport system of FIG. 1 according to an alternative embodiment of the disclosure.

FIG. 3 shows a block diagram of an electrical circuit 300 that can be used as signal processor 170 (FIG. 1) according to an alternative embodiment of the disclosure. Circuit 300 is generally designed for processing electrical signals derived from optical PAM signals. Similar to circuit 200 (FIG. 2), circuit 300 is illustratively shown as being configured to receive electrical signal 162 and output the recovered communication signal 112 (also see FIG. 1). One of ordinary skill in the art will understand that alternative input/output configurations of circuit 300 are also possible.

Electrical circuit 300 includes a dc filter 310 configured to remove the dc component of electrical signal 162, thereby generating a filtered electrical signal 312. An analog-to-digital converter (ADC) 320 operates to convert filtered electrical signal 312 into a corresponding digital electrical signal 322 configured to carry a sequence of digital samples representing signal 312. ADC 320 is clocked using a clock signal 318 generated by a clock-recovery module 324. A first copy of digital electrical signal 322 is applied to an adder 350. A second copy of digital electrical signal 322 is applied to an SSBI-estimation branch 302.

In an example embodiment, branch 302 comprises a continuous SSB generator 330 and a squaring module 340 that are functionally analogous to analog SSB generator 220 and squaring module 230 (FIG. 2), respectively. However, one difference between branch 302 and branch 202 is that branch 302 is configured to receive and process a digital input signal, whereas branch 202 is configured to receive and process an analog input signal. An example embodiment of continuous SSB generator 330 is described in more detail below in reference to FIG. 4. Similar to squaring module 230 (FIG. 2), squaring module 340 may be configured to use a preset value of $\gamma$ or use an optional feedback path 270 (not explicitly shown in FIG. 3) to iteratively find and set an optimal value of $\gamma$, e.g., as already described above in reference to FIG. 2.

Adder 350 operates to generate a corrected digital signal 352 by summing digital signal 322 and a digital signal 342 generated by branch 302. One of ordinary skill in the art will appreciate that corrected digital signal 352 is substantially generated in accordance with Eq. (11). As such, corrected digital signal 352 is characterized by a significantly reduced or canceled SSBI impairment.

An adaptive equalizer 360 operates to further process corrected digital signal 352, e.g., to reduce the adverse effects of inter-symbol-interference due to CD and/or bandwidth limitations of the analog components used in transmitter 102 and upstream circuits of receiver 104 (FIG. 1). Adaptive equalizer 360 further operates to generate an input signal 358 for clock-recovery module 324, which signal is used therein to set the sampling frequency and phase of ADC 320. An example circuit and algorithm that can be used to implement clock-recovery module 324 are disclosed, e.g., in M. Oerder and H. Meyr, "Digital filter and square timing recovery," IEEE Transactions on Communications, 1988, vol. 36, no. 5, pp. 605-612, which is incorporated herein by reference in its entirety. A slicer 370 is configured to further quantize a digital signal 362 generated by adaptive equalizer 360, e.g., based on minimum-distance decisions. The digital output signal generated by slicer 370 is the recovered communication signal 112 (also see FIG. 1).

Figure 4:
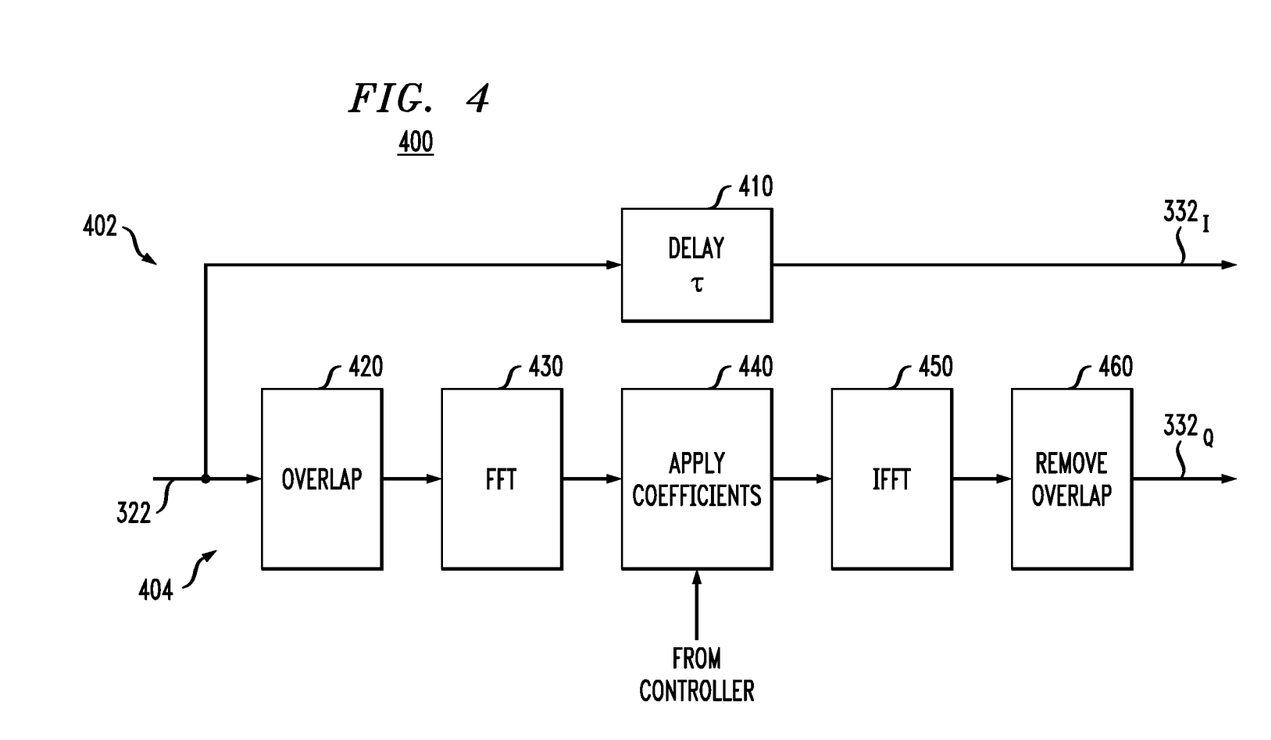
FIG. 4 shows a block diagram of a digital electrical circuit that can be used in the electrical circuit of FIG. 3 according to an embodiment of the disclosure.

FIG. 4 shows a block diagram of a digital electrical circuit 400 that can be used as continuous SSB generator 330 (FIG. 3) according to an embodiment of the disclosure. As such, circuit 400 is illustratively shown in FIG. 4 as being configured to receive digital electrical signal 322 and output a digital electrical signal 332 (also see FIG. 3). One of ordinary skill in the art will understand that alternative input/output configurations of circuit 400 are also possible.

Circuit 400 is generally configured to generate a complex-valued output in accordance with Eq. (14):

$$S_{332}(t+\tau)=S_{322}(t)+j\mathcal{H}\{S_{322}(t)\} \quad (14)$$

where $S_{332}$ and $S_{322}$ denote signals 222 and 212, respectively; and $\tau$ is the insertion delay of circuit 400. An electrical line labeled $332_I$ is configured to carry the real part (or the in-phase component) of signal $S_{332}$. An electrical line labeled $332_Q$ is similarly configured to carry the imaginary part (or the quadrature component) of signal $S_{332}$. One of ordinary skill in the art will understand that signal $S_{332}$ is a baseband signal configured for single-sideband modulation.

Circuit 400 comprises two parallel branches labeled 402 and 404, with each of the branches configured to receive a respective copy of digital electrical signal 322. Branch 402 comprises a delay element 410 configured to introduce a delay time $\tau$, where $\tau$ is the signal-processing time in branch 404. As such, delay element 410 causes digital signals on electrical lines $332_I$ and $332_Q$ to be properly aligned in time.

Branch 404 is configured to operate on blocks of digital samples supplied by digital electrical signal 322. An overlap module 420 causes the adjacent blocks of digital samples that are serially processed by branch 404 to overlap by a predetermined number of samples. In different embodiments, overlap module 420 may introduce an overlap at the beginning of the block or at the end of the block, or both. A fast Fourier-transform (FFT) module 430 operates to apply a Fourier transform to the block of signal samples supplied by overlap module 420 to generate a corresponding block of spectral samples. A digital filter 440 then filters the spectral samples received from FFT module 430 in the frequency domain by applying to each a respective weighting coefficient. The values of the weighting coefficients used in digital filter 440 are set by an appropriate controller (not explicitly shown in FIG. 4) and are selected such that the transfer function of the digital filter approximates the infinite-impulse response of a Hilbert filter (by a finite-impulse response). An inverse-FFT module 450 then applies an inverse Fourier transform to the block of filtered spectral samples received from digital filter 440 to generate a corresponding block of Hilbert-transformed signal samples. Finally, an overlap-removal module 460 removes the Hilbert-transformed signal samples corresponding to the overlap introduced in overlap module 420 and then serially outputs on electrical line $332_Q$ the samples of the resulting truncated block of Hilbert-transformed signal samples.

Figure 5:
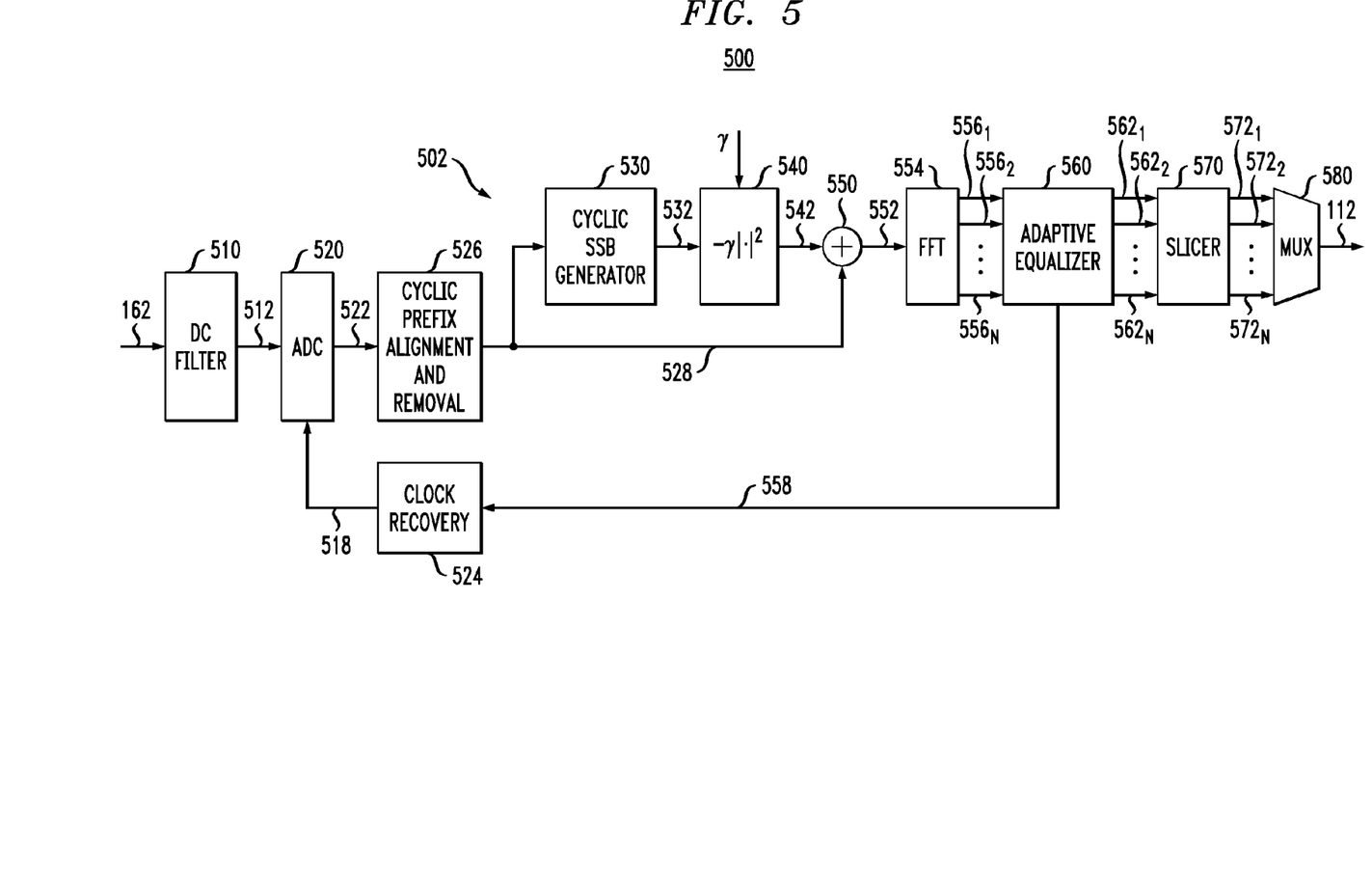
FIG. 5 shows a block diagram of an electrical circuit that can be used in the optical transport system of FIG. 1 according to yet another alternative embodiment of the disclosure.

FIG. 5 shows a block diagram of an electrical circuit 500 that can be used as signal processor 170 (FIG. 1) according to yet another alternative embodiment of the disclosure. More specifically, circuit 500 is designed for processing electrical signals derived from optical orthogonal frequency-division multiplexed (OFDM) signals or discrete multi-tone (DMT) signals. Similar to circuit 200 (FIG. 2) and circuit 300 (FIG. 3), circuit 500 is illustratively shown as being configured to receive electrical signal 162 and output the recovered communication signal 112 (also see FIG. 1). One of ordinary skill in the art will understand that alternative input/output configurations of circuit 500 are also possible. For illustration purposes, the operation of circuit 500 is described below in reference to an embodiment designed for processing OFDM signals. Based on the provided description, one of ordinary skill in the art will understand how to make and use an embodiment of circuit 500 designed for processing DMT signals.

Electrical circuit 500 includes a dc filter 510 configured to remove the dc component of electrical signal 162, thereby generating a filtered electrical signal 512. An analog-to-digital converter (ADC) 520 operates to convert filtered electrical signal 512 into a corresponding digital electrical signal 522 configured to carry a sequence of digital samples representing signal 512. ADC 520 is clocked using a clock signal 518 generated by a clock-recovery module 524.

A cyclic-prefix alignment and removal module 526 operates to align and remove the cyclic prefix from each OFDM block of signal samples received from ADC 520, thereby transforming digital electrical signal 522 into a corresponding digital electrical signal 528. A first copy of digital electrical signal 528 is then applied to an adder 550. A second copy of digital electrical signal 528 is applied to an SSBI-estimation branch 502.

In an example embodiment, branch 502 comprises a cyclic SSB generator 530 and a squaring module 540 that are functionally analogous to continuous SSB generator 330 and squaring module 340 (FIG. 3), respectively. An example embodiment of cyclic SSB generator 530 is described in more detail below in reference to FIG. 6. Similar to squaring module 340 (FIG. 3), squaring module 540 may be configured to use a preset value of γ or use an optional feedback path 270 (not explicitly shown in FIG. 5) to iteratively find and set an optimal value of γ, e.g., as already described above in reference to FIG. 2.

Adder 550 operates to generate a corrected digital signal 552 by summing digital signal 528 and a digital signal 542 generated by branch 502. One of ordinary skill in the art will appreciate that corrected digital signal 552 is substantially generated in accordance with Eq. (11). As such, corrected digital signal 552 is characterized by a significantly reduced or canceled SSBI impairment.

A fast Fourier-transform (FFT) module 554 operates to apply a Fourier transform to the signal samples supplied by adder 550 to split corrected digital signal 552 into the plurality of OFDM sub-channels $556_1$-$556_N$. A multi-channel equalizer 560 operates to individually equalize each of OFDM sub-channels $556_1$-$556_N$, e.g., to reduce the adverse effects of inter-symbol-interference therein. Multi-channel equalizer 560 further operates to generate an input signal 558 for clock-recovery module 524, which signal is used therein to set the sampling frequency and phase of ADC 520. In an example embodiment, an individual channel of multi-channel equalizer 560 may be similar to adaptive equalizer 360 (FIG. 3).

A slicer 570 is configured to map the complex-valued samples carried by each of equalized OFDM sub-channels $562_1$-$562_N$ onto the operative constellation, thereby generating recovered data streams $572_1$-$572_N$, each corresponding to a respective one of the OFDM channels. A multiplexer 580 then appropriately multiplexes recovered data streams $572_1$-$572_N$, to reconstruct the original communication signal 112 (also see FIG. 1).

Figure 6:
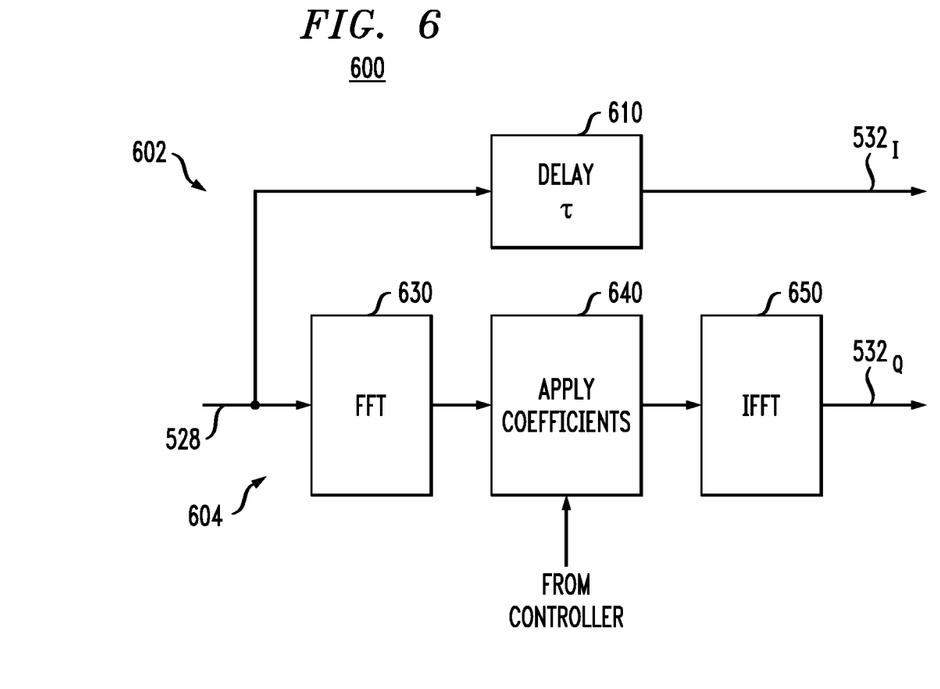
FIG. 6 shows a block diagram of a digital electrical circuit that can be used in the electrical circuit of FIG. 5 according to an embodiment of the disclosure.

FIG. 6 shows a block diagram of a digital electrical circuit 600 that can be used as cyclic SSB generator 530 (FIG. 5) according to an embodiment of the disclosure. As such, circuit 600 is illustratively shown in FIG. 6 as being configured to receive digital electrical signal 528 and output a digital electrical signal 532 (also see FIG. 5). One of ordinary skill in the art will understand that alternative input/output configurations of circuit 600 are also possible.

Circuit 600 is generally designed for a system where a cyclic prefix is used to emulate a periodic signal, such as an OFDM system. Circuit 600 operates to generate a complex-valued output in accordance with Eq. (15):

$$S_{532}(t+\tau)=S_{528}(t)+j\mathcal{H}\{S_{528}(t)\} \quad (15)$$

where $S_{532}$ and $S_{528}$ denote signals 532 and 528, respectively; and τ is the insertion delay of circuit 600. An electrical line labeled $532_I$ is configured to carry the real part (or the in-phase component) of signal $S_{532}$. An electrical line labeled $532_Q$ is similarly configured to carry the imaginary part (or the quadrature component) of signal $S_{532}$. One of ordinary skill in the art will understand that signal $S_{532}$ is a baseband signal configured for single-sideband modulation.

Circuit 600 comprises two parallel branches labeled 602 and 604, with each of the branches configured to receive a respective copy of digital electrical signal 528. Branch 602 comprises a delay element 610 configured to introduce a delay time τ, where τ is the signal-processing time in branch 604. As such, delay element 610 causes digital signals on electrical lines $532_I$ and $532_Q$ to be properly aligned in time.

Branch 604 is configured to operate on blocks of digital samples supplied by digital electrical signal 528. A fast Fourier-transform (FFT) module 630 operates to apply a Fourier transform to a block of signal samples to generate a corresponding block of spectral samples. A digital filter 640 then filters the spectral samples received from FFT module 630 in the frequency domain by applying to each a respective weighting coefficient. The values of the weighting coefficients used in digital filter 640 are set by an appropriate controller (not explicitly shown in FIG. 6) and are selected such that the transfer function of the digital filter approximates the finite-impulse response of a Hilbert filter. An inverse-FFT module 650 then applies an inverse Fourier transform to the block of filtered spectral samples received from digital filter 640 to generate a corresponding block of Hilbert-transformed signal samples that are then serially output on electrical line $532_Q$.

According to an example embodiment disclosed above in reference to FIGS. 1-6, provided is an apparatus (e.g., 100, FIG. 1) comprising: an optical detector (e.g., 160, FIG. 1) configured to convert an optical input signal (e.g., 142', FIG. 1) into a first electrical signal (e.g., 162, FIG. 1) proportional to an optical power of the optical input signal; and an electrical signal-processing circuit (e.g., 170, FIG. 1) that comprises: a single-sideband generator (e.g., 220, FIG. 2; 330, FIG. 3; 530, FIG. 5) configured to generate a second electrical signal (e.g., 222, FIG. 2; 332, FIG. 3; 532, FIG. 5) based on the first electrical signal, wherein the second electrical signal is a baseband signal configured for single-sideband modulation; a circuit module (e.g., 230, FIG. 2; 340, FIG. 3; 540, FIG. 5) configured to convert the second electrical signal into a third electrical signal (e.g., 232, FIG. 2; 342, FIG. 3; 542, FIG. 5) configured to approximate a magnitude of signal-signal beat interference (SSBI) in the first electrical signal; and an adder (e.g., 240, FIG. 2; 350, FIG. 3; 550, FIG. 5) configured to subtract the third electrical signal from the first electrical signal to generate a corrected baseband signal (e.g., 242, FIG. 2; 352, FIG. 3; 552, FIG. 5). The electrical signal processing circuit is configured to recover data encoded in the optical input signal based on the corrected baseband signal.

In some embodiments of the above apparatus, the optical detector is not configured to use an optical local-oscillator signal in a process of generating the first electrical signal.

In some embodiments of any of the above apparatus, the optical detector is configured to generate the first electrical signal to be proportional to squared amplitude of an electromagnetic field of the optical input signal.

In some embodiments of any of the above apparatus, the single-sideband generator is an analog electrical circuit (e.g., 220, FIG. 2).

In some embodiments of any of the above apparatus, the single-sideband generator is a digital electrical circuit (e.g., 330, FIG. 3).

In some embodiments of any of the above apparatus, the single-sideband generator is configured to apply a Hilbert transform (e.g., in accordance with Eq. (14) or (15)) to generate the second electrical signal.

In some embodiments of any of the above apparatus, the electrical signal processing circuit is configured to recover the data (e.g., using 300, FIG. 3) modulated onto the optical input signal using pulse-amplitude modulation.

In some embodiments of any of the above apparatus, the electrical signal processing circuit is configured to recover the data (e.g., using 500, FIG. 5) modulated onto the optical input signal using orthogonal frequency-division multiplexing.

In some embodiments of any of the above apparatus, the circuit module is configured to generate the third electrical signal to be proportional to an electrical power of the second electrical signal (e.g., in accordance with Eq. (13)).

In some embodiments of any of the above apparatus, the circuit module is configured to generate the third electrical signal by applying a scaling factor (e.g., $\gamma$, Eq. (13)) to a value of the electrical power of the second electrical signal; and the electrical signal processing circuit further comprises a feedback path (e.g., 270, FIG. 2) between a decoder (e.g., 260, FIG. 2) configured to recover the data and the circuit module, said feedback path being configured to change a value of the scaling factor based on a performance metric of the electrical signal processing circuit.

In some embodiments of any of the above apparatus, the performance metric is a bit-error rate corresponding to the data, as recovered by the decoder.

In some embodiments of any of the above apparatus, the electrical signal processing circuit further comprises a dc filter (e.g., 210, FIG. 2) disposed between the optical detector and the single-sideband generator and configured to remove a dc component from the first electrical signal and apply a resulting dc-filtered electrical signal (e.g., 212, FIG. 2) to the single-sideband generator for conversion into the second electrical signal therein.

In some embodiments of any of the above apparatus, the single-sideband generator comprises a first processing branch (e.g., 404, FIG. 4; 604, FIG. 6) that includes: a Fourier-transform module (e.g., 430, FIG. 4; 630, FIG. 6) configured to apply a Fourier transform to convert a plurality of signal samples corresponding to the first electrical signal into a plurality of spectral samples; a digital filter (e.g., 440, FIG. 4; 640, FIG. 6) configured to scale each of the plurality of the spectral samples by applying to each a respective weighting coefficient; and an inverse-Fourier-transform module (e.g., 450, FIG. 4; 650, FIG. 6) configured to apply an inverse Fourier transform to a scaled plurality of spectral samples received from the digital filter to generate a corresponding first portion of the second electrical signal.

In some embodiments of any of the above apparatus, the electrical signal processing circuit further comprises a filter controller configured to set values of the respective weighting coefficients to cause the first processing branch to perform a Hilbert transform. In some embodiments of any of the above apparatus, the single-sideband generator comprises a second processing branch (e.g., 402, FIG. 4; 602, FIG. 6) connected in parallel to the first processing branch and configured to receive the plurality of signal samples corresponding to the first electrical signal, wherein said second branch includes a delay element (e.g., 410, FIG. 4; 610, FIG. 6) configured to delay the plurality of signal samples corresponding to the first electrical signal by a delay time equal to a signal-processing time in the first branch to generate a corresponding second portion of the second electrical signal.

In some embodiments of any of the above apparatus, the optical detector and the signal-processing circuit are parts of an optical receiver (e.g., 104, FIG. 1).

In some embodiments of any of the above apparatus, the apparatus further comprises an optical transmitter (e.g., 102, FIG. 1) configured to cause the optical detector to receive the optical input signal.

In some embodiments of any of the above apparatus, the optical transmitter is configured to generate the optical input signal using single-sideband modulation of an optical carrier.

In some embodiments of any of the above apparatus, the optical transmitter is further configured to generate the optical input signal using pulse-amplitude modulation.

In some embodiments of any of the above apparatus, the optical transmitter is further configured to generate the optical input signal using orthogonal frequency-division multiplexing.

According to another example embodiment disclosed above in reference to FIGS. 1-6, provided is an optical-communication method comprising the steps of: (A) converting an optical input signal (e.g., 142', FIG. 1) into a first electrical signal (e.g., 162, FIG. 1) proportional to an optical power of the optical input signal; (B) generating a second electrical signal (e.g., 222, FIG. 2; 332, FIG. 3; 532, FIG. 5) based on the first electrical signal, wherein the second electrical signal is a baseband signal configured for single-sideband modulation; (C) converting the second electrical signal into a third electrical signal (e.g., 232, FIG. 2; 342, FIG. 3; 542, FIG. 5) configured to approximate a magnitude of signal-signal beat interference in the first electrical signal; (D) subtracting the third electrical signal from the first electrical signal to generate a corrected baseband signal (e.g., 242, FIG. 2; 352, FIG. 3; 552, FIG. 5); and (E) recovering data encoded in the optical input signal based on the corrected baseband signal.

A significant benefit of the disclosed embodiments is that the complexity of digital-signal processing may be considerably reduced compared to that in comparably performing prior-art systems. An additional benefit is that some embodiments can be implemented in the analog domain, while some other embodiment can be implemented in the digital domain. Furthermore, embodiments for both PAM and OFDM modulation formats are provided.

While this disclosure includes references to illustrative embodiments, this specification is not intended to be construed in a limiting sense.

For example, although SSB generators 220, 330, and 530 have been described as being designed and configured to use a Hilbert transform for the generation of a corresponding baseband signal configured for SSB modulation, alternative methods for generating baseband signals suitable for SSB modulation may also be used without departing from the inventive concept disclosed herein.

Although embodiments of the disclosure have been described in reference to optical carrier frequencies, the invention is not so limited. One of ordinary skill in the art will understand how to make and use embodiments that handle other carrier frequencies, e.g., from the radio-frequency (RF) range.

For example, an embodiment of an inventive apparatus configured for a carrier frequency from the RF range may comprise: an RF detector configured to convert an RF input signal into a first electrical signal proportional to an RF power of the RF input signal; and an electrical signal-processing circuit that comprises: a single-sideband generator configured to generate a second electrical signal based on the first electrical signal, wherein the second electrical signal is a baseband signal configured for single-sideband modulation; a circuit module configured to convert the second electrical signal into a third electrical signal configured to approximate a magnitude of SSBI in the first electrical signal; and an adder configured to subtract the third electrical signal from the first electrical signal to generate a corrected baseband signal. The electrical signal processing circuit is configured to recover data encoded in the RF input signal based on the corrected baseband signal.

Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Some embodiments may be implemented as circuit-based processes, including possible implementation on a single integrated circuit.

Some embodiments can be embodied in the form of methods and apparatus for practicing those methods.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The description and drawings merely illustrate the principles of the disclosure. It will thus be appreciated that those of ordinary skill in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. An apparatus comprising:
   an optical detector configured to convert an optical input signal into a first electrical signal proportional to an optical power of the optical input signal; and
   an electrical signal-processing circuit that comprises:
      a single-sideband generator configured to generate a second electrical signal based on the first electrical signal, wherein the second electrical signal is a baseband signal configured for single-sideband modulation;
      a circuit module configured to convert the second electrical signal into a third electrical signal configured to approximate a magnitude of signal-signal beat interference in the first electrical signal; and
      an adder configured to subtract the third electrical signal from the first electrical signal to generate a corrected baseband signal; and
   wherein the electrical signal processing circuit is configured to recover data encoded in the optical input signal based on the corrected baseband signal.

2. The apparatus of claim 1, wherein the optical detector is not configured to use an optical local-oscillator signal in a process of generating the first electrical signal.

3. The apparatus of claim 1, wherein the optical detector is configured to generate the first electrical signal to be proportional to squared amplitude of an electromagnetic field of the optical input signal.

4. The apparatus of claim 1, wherein the single-sideband generator is an analog electrical circuit.

5. The apparatus of claim 1, wherein the single-sideband generator is a digital electrical circuit.

6. The apparatus of claim 1, wherein the single-sideband generator is configured to apply a Hilbert transform to generate the second electrical signal.

7. The apparatus of claim 1, wherein the electrical signal processing circuit is configured to recover the data modulated onto the optical input signal using pulse-amplitude modulation.

8. The apparatus of claim 1, wherein the electrical signal processing circuit is configured to recover the data modulated onto the optical input signal using orthogonal frequency-division multiplexing.

9. The apparatus of claim 1, wherein the circuit module is configured to generate the third electrical signal to be proportional to an electrical power of the second electrical signal.

10. The apparatus of claim 9, wherein:
the circuit module is configured to generate the third electrical signal by applying a scaling factor to a value of the electrical power of the second electrical signal; and
the electrical signal processing circuit further comprises a feedback path between a decoder configured to recover the data and the circuit module, said feedback path being configured to change a value of the scaling factor based on a performance metric of the electrical signal processing circuit.

11. The apparatus of claim 10, wherein the performance metric is a bit-error rate corresponding to the data, as recovered by the decoder.

12. The apparatus of claim 1, wherein the electrical signal processing circuit further comprises a dc filter disposed between the optical detector and the single-sideband generator and configured to remove a dc component from the first electrical signal and apply a resulting dc-filtered electrical signal to the single-sideband generator for conversion into the second electrical signal therein.

13. The apparatus of claim 1, wherein the single-sideband generator comprises a first processing branch that includes:
a Fourier-transform module configured to apply a Fourier transform to convert a plurality of signal samples corresponding to the first electrical signal into a plurality of spectral samples;
a digital filter configured to scale each of the plurality of the spectral samples by applying to each a respective weighting coefficient; and
an inverse-Fourier-transform module configured to apply an inverse Fourier transform to a scaled plurality of spectral samples received from the digital filter to generate a corresponding first portion of the second electrical signal.

14. The apparatus of claim 13, wherein the electrical signal processing circuit further comprises a filter controller configured to set values of the respective weighting coefficients to cause the first processing branch to perform a Hilbert transform.

15. The apparatus of claim 13, wherein the single-sideband generator comprises a second processing branch connected in parallel to the first processing branch and configured to receive the plurality of signal samples corresponding to the first electrical signal, wherein said second branch includes a delay element configured to delay the plurality of signal samples corresponding to the first electrical signal by a delay time equal to a signal-processing time in the first branch to generate a corresponding second portion of the second electrical signal.

16. The apparatus of claim 1,
wherein the optical detector and the signal-processing circuit are parts of an optical receiver; and
wherein the apparatus further comprises an optical transmitter configured to cause the optical detector to receive the optical input signal.

17. The apparatus of claim 16, wherein the optical transmitter is configured to generate the optical input signal using single-sideband modulation of an optical carrier.

18. The apparatus of claim 17, wherein the optical transmitter is further configured to generate the optical input signal using pulse-amplitude modulation.

19. The apparatus of claim 17, wherein the optical transmitter is further configured to generate the optical input signal using orthogonal frequency-division multiplexing.

20. An optical-communication method comprising:
converting an optical input signal into a first electrical signal proportional to an optical power of the optical input signal;
generating a second electrical signal based on the first electrical signal, wherein the second electrical signal is a baseband signal configured for single-sideband modulation;
converting the second electrical signal into a third electrical signal configured to approximate a magnitude of signal-signal beat interference in the first electrical signal;
subtracting the third electrical signal from the first electrical signal to generate a corrected baseband signal; and
recovering data encoded in the optical input signal based on the corrected baseband signal.

* * * * *